United States Patent [19]

Frigo

[11] Patent Number: 4,741,677
[45] Date of Patent: May 3, 1988

[54] ELECTRICAL COMPRESSOR FOR MOTOR VEHICLE HORNS, COMPRISING AN ELECTRIC MOTOR AND AIR COMPRESSOR IN MUTUAL AXIAL ALIGNMENT RELATIONSHIP

[75] Inventor: Domenico Frigo, Vicenza, Italy

[73] Assignee: Fiamm Componenti Accessori S.p.A., Vicenza, Italy

[21] Appl. No.: 796,912

[22] Filed: Nov. 12, 1985

[30] Foreign Application Priority Data

Nov. 14, 1984 [IT] Italy ................... 2377/84[U]

[51] Int. Cl.⁴ .................. F04B 17/00; F04B 35/04
[52] U.S. Cl. .................. 417/366; 417/423 R; 310/63; 310/244
[58] Field of Search ........... 417/371, 368, 366, 410, 417/902, 424, 423 R; 310/244, 63, 42, 89

[56] References Cited

U.S. PATENT DOCUMENTS

| | | | |
|---|---|---|---|
| 2,648,286 | 8/1953 | Bergh | 415/501 |
| 2,825,286 | 3/1958 | White | 417/371 |
| 3,318,249 | 5/1967 | Loeser | 417/410 |
| 3,444,402 | 5/1969 | Cartier | 310/244 |
| 3,495,538 | 2/1970 | Kruckeberg | 417/410 |
| 3,516,766 | 6/1970 | Monden et al. | 417/424 |
| 3,969,044 | 7/1976 | Füssner et al. | 417/366 |
| 4,466,780 | 8/1984 | Naurath | 417/424 |
| 4,538,968 | 9/1985 | Kusakawa | 417/368 |
| 4,551,074 | 11/1985 | Asaka et al. | 417/366 |

Primary Examiner—Carlton R. Croyle
Assistant Examiner—Donald E. Stout
Attorney, Agent, or Firm—Hedman, Gibson, Costigan & Hoare

[57] ABSTRACT

An electrical compressor for motor vehicle horns, free from water seepage and simple construction wise comprises, all in axial alignment relationship, an electric motor having a stator, a pair of brushes, and a shaft provided with a rotor winding and a commutator, an air compressor having a casing by said shaft, and a bowl-type shell wherein said electric motor and air compressor are mounted coaxially adjacent to the bowl bottom and bowl opening, respectively.

4 Claims, 3 Drawing Sheets

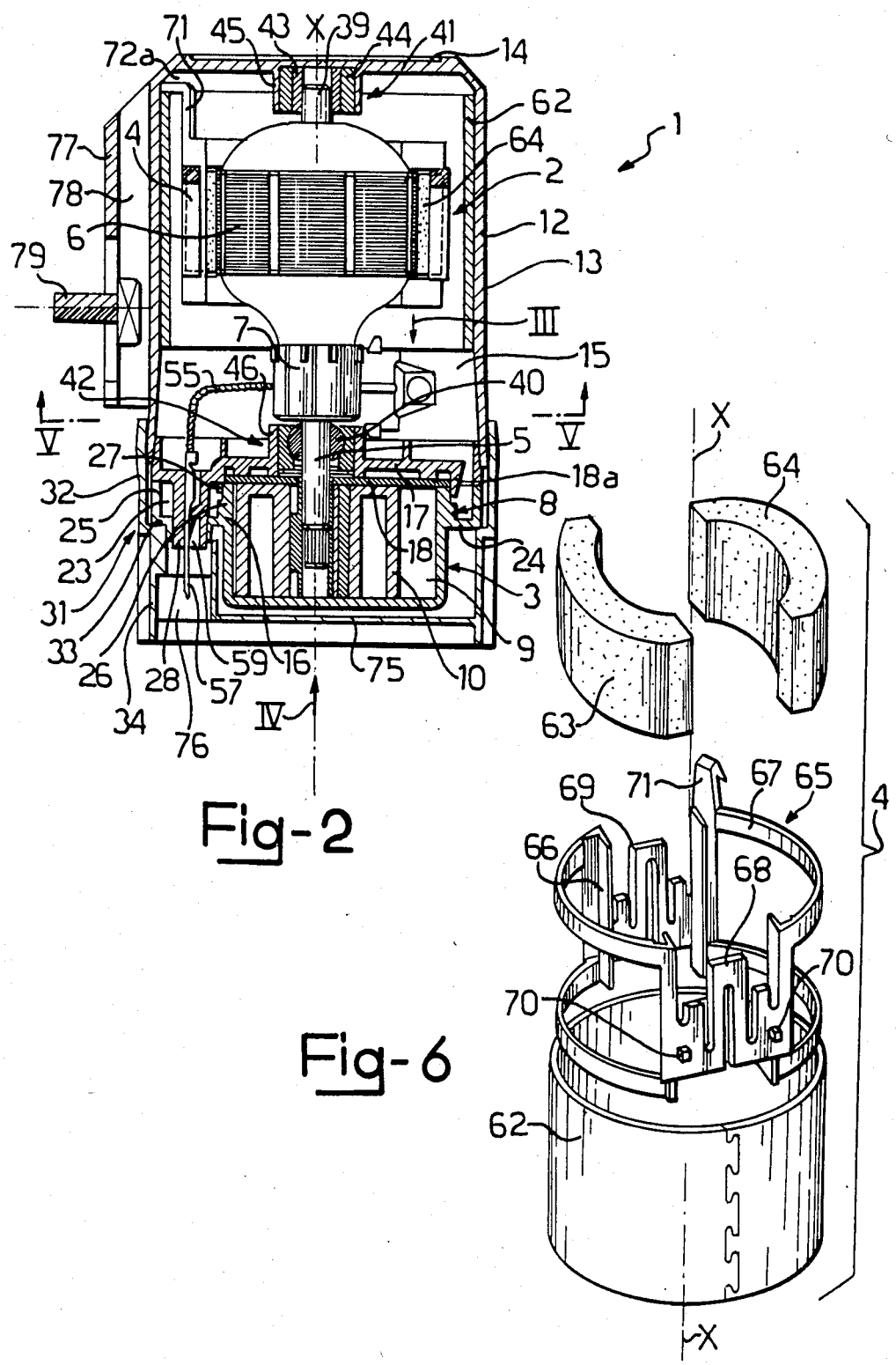

ELECTRICAL COMPRESSOR FOR MOTOR VEHICLE HORNS, COMPRISING AN ELECTRIC MOTOR AND AIR COMPRESSOR IN MUTUAL AXIAL ALIGNMENT RELATIONSHIP

BACKGROUND OF THE INVENTION

This invention relates to an electrically operated compressor for motor vehicle horns, of a type which comprises, arranged in mutual axial alingment relationship, an electric motor having a stator, a pair of brushes, and a shaft carrying a rotor winding and a commutator, and an air compressor having a casing and a vane rotor driven rotatively by said shaft within said casing.

Such an electrical compressor is designed for installation on a motor vehicle equipped with at least one air-operated horn for the purpose of supplying it with compressed air on demand.

Conventional electrical compressors of the type indicated above, while performing satisfactorily all-around and accomplishing substantially their object, still have some drawbacks in need of a remedy.

In fact, they are prone to water seepage as a motor vehicle is driven in the rain, even though they are generally installed at locations under the engine hood which are protected as best as possible. Water seepage affects the electric portion of the electrical compressor and may well jeopardize the effectiveness of horns if allowed to get at them.

It has been suggested of guarding such electrical compressors by means of a pair of juxtaposed shell halves. That approach, however, shows to be expensive, inconvenient, and likely to result in the compressor unit overheating.

Another drawback of prior horn electrical compressors is inherent to their complex construction, and reflects in a high cost, hardly to be conceded with an accessory item such as this, and bound to hinder its widespread commercial acceptance.

SUMMARY OF THE INVENTION

It is an object of this invention to provide an electrically operated compressor as indicated, which affords such constructional and functional features as to overcome the aforesaid drawbacks.

This object is achieved by an electrical compressor of the type specified characterized in that it comprises a bowl-type shell wherein an electric motor and air compressor are mounted coaxially adjacent to the bowl bottom and the bowl opening, respectively.

Advantageously, the air compressor casing forms a closure for said bowl-type shell.

BRIEF DESCRIPTION OF THE DRAWINGS

Further features and advantages of the electrical compressor according to the invention will be apparent from the following description of a preferred embodiment thereof, given herein by way of illustration and not of limitation with reference to the accompanying drawings, where:

FIG. 2 is a sectional view of the electrical compressor of FIG. 1, taken along the line II—II of FIG. 4;

FIG. 6 is an exploded perspective view of a further detail of the electrical compressor of FIG. 1.

DESCRIPTION OF THE PREFERRED EMBODIMENT

Figure 1:
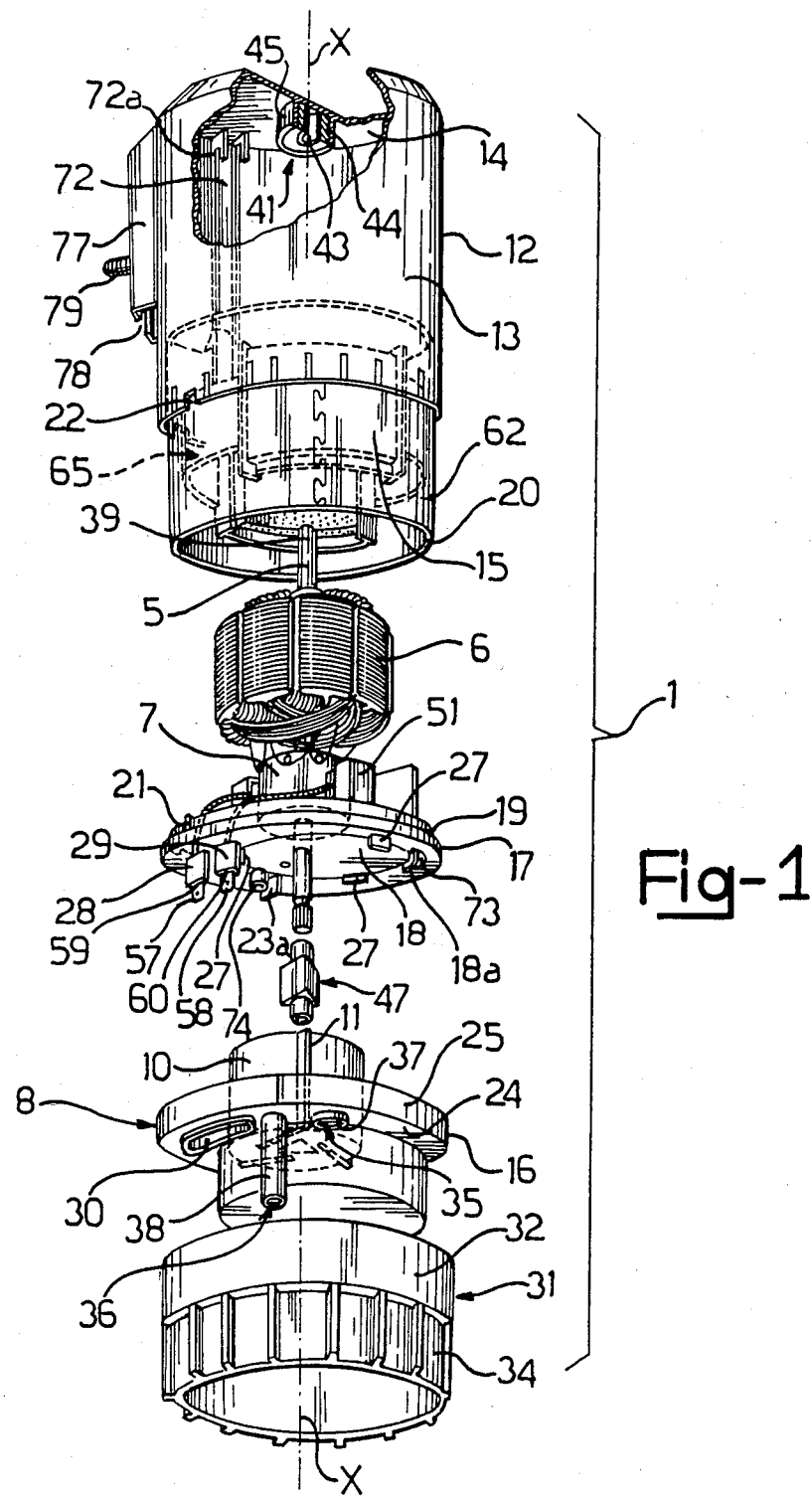
FIG. 1 is an exploded, scrap-sectional, perspective view of an electrical compressor according to the invention.
Figure 5:
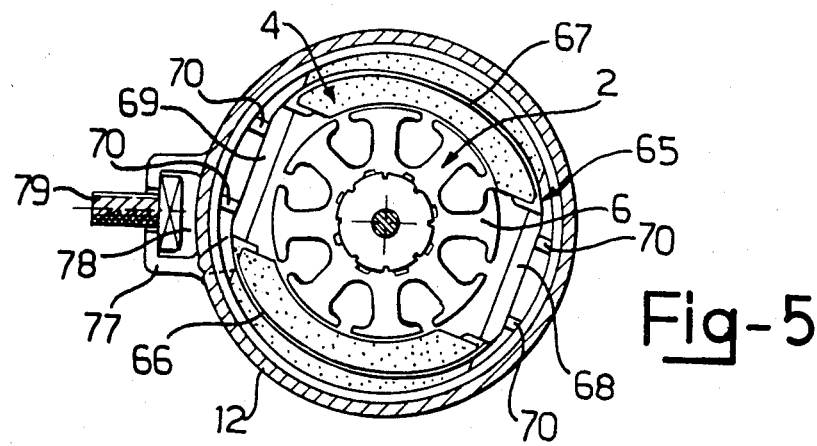
FIG. 5 is a sectional view of the electrical compressor of FIG. 1, taken along the line V—V.
Figure 4:
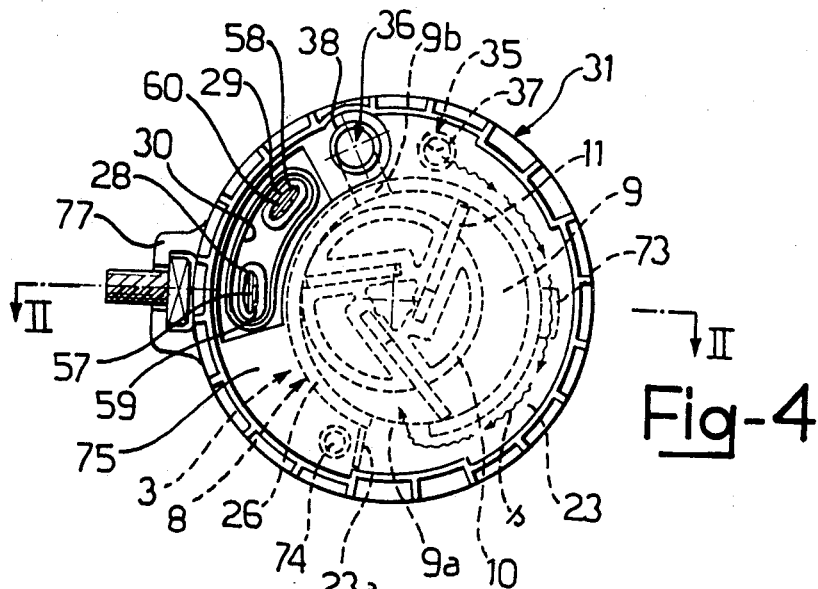
FIG. 4 is a view of the electrical compressor of FIG. 1, taken in the direction of the arrow IV.
Figure 3:
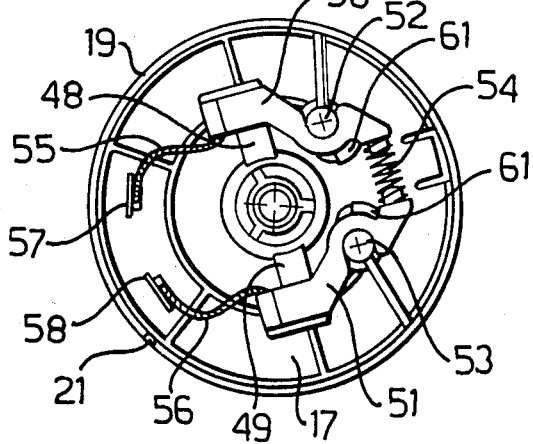
FIG. 3 is a view showing a detail of the electrical compressor of FIG. 1, as taken in the direction of the arrow III of FIG. 2.

With reference to the drawing figures, the numeral 1 designates generally an electrically operated compressor according to this invention.

The electrical compressor 1 comprises, laid in axial alignment along an axis X—X, an electric motor 2 and an air compressor 3 driven by the motor 2.

The axis X—X would extend vertically in the recommended condition for installation of the electrical compressor on a motor vehicle.

The electric motor 2 comprises a stator 4 and a shaft 5 carrying a rotor winding 6 and commutator 7. The shaft 5 is rotatable in the stator 4 and supported in a manner to be explained.

The air compressor 3 comprises a casing 8 having an off-centered chamber 9 and a rotor 10 of a plastic material such as an acetalic resin. The rotor 10 is mounted rotatively within said chamber 9 and provided with substantially radial vanes, collectively indicated at 11.

The inventive electrical compressor 1 also comprises a bowl-type outer shell 12, having an axis X—X and including a cylindrical skirt 13, a bottom 14, and an opening 15. Said bowl-type shell 12, in the recommended installed condition of the inventive electrical compressor, would be upside down, that is with the opening 15 pointing downwards.

The shell 12 is formed from a plastic such as polypropylene.

The electric motor 2 is accommodated within the shell 12 adjacently to its bottom 14, whereas the air compressor is mounted adjacent to its opening 15, the compressor casing 8 forming a closure for the bowl-type shell 12.

It should be noted that the compressor casing 8 is composed of a substantially cylindrical main body 16, die-cast from aluminum, wherein said off-centered chamber 9 is formed eccentrically, and of a cap 17 of disk-like shape, being set concentrically to the main body 16 and forming a stop wall for the off-center chamber 9.

Advantageously, the cap 17, which would be formed from such a plastic material as polypropylene, is provided with a small off-center disk 18 made of metal, preferably of aluminum. The disk 18 is set in that face of the cap 17 which confronts the off-center chamber 9, snap-engaged by a tab 18a, and extends across the off-center chamber 9.

The casing 8 is mounted, on the side of the opening 16 of the shell 12, such that the cap 17 faces inwards of the shell 12 and the main body 16 faces outwards.

More specifically, around the edge of the cap 17, there is formed a step 19, on which the shell 12 abuts with its free edge, indicated at 20 in the drawings. A dog 21 formed on the cap 17 at the step 19 engages in a notch 22 formed in the shell 12 at the free edge 20 thereof to provide set mutual angular positions for the cap 17 and shell 12.

The reference numeral 23 denotes a substantially annular channel formed in the main body 16 and extending around the off-center chamber 9. In particular, the channel 23 is open to the cap 17 and has a bottom, indicated at 24, a cylindrical outer wall 25 forming the edge of the main body 16, and a cylindrical inner wall 26 off-centered to the wall 25 which also defines a wall for the off-center chamber 9.

Indicated at 27 are three tenons protruding from the cap 17 and engaging the channel 23 against the wall 26 for mutually aligning the main body 16 with the cap 17.

At 28 and 29, there are indicated two side-by-side posts protruding from the cap 17 and extending through the channel 23 and a slot 30 formed in the bottom 24 of the channel 23, thereby set mutual angular positions of the cap 17 with respect to the main body 16 can be achieved.

The main body 16 and cap 17 are secured to each other and made rigid with the shell 12 by an annular element 31, having an axis X—X and being made of a plastic material such as polypropylene.

The annular element 31 has an annular band 32 force fitted over the shell 12, and an inner step 33 abutting against the main body 16 at the bottom 24 of the channel 23.

Advantageously, the annular element 31 is extended axially beyond the step 33 into a cylindrical skirt 34 extending around the main body 16.

Indicated at 35 and 36 are ports formed through the casing 8 of the compressor 3, respectively an air intake port and air delivery port. In particular, the ports 35 and 36 extend in an axial direction. The intake port 35 comprises a hole 37 formed through the bottom 24 of the channel 23, said channel 23 being in communication with the chamber 9 through a passage 9a formed in the inner wall 26 of the channel. The hole 37 and passage 9a are located diametrically opposite each other along the channel 23, thereby the intake air would flow through the channel 23 along a semicircular path indicated at s in the drawings, it being prevented from flowing along the other semicircular path by a partition 23a provided in the channel 23 in the proximity of the passage 9a, said partition being in the form of a plate-like appendage projecting from the cap 17.

The delivery port 36 is a tubular appendage 38 extending in the axial direction and being put in fluid communication with the chamber 9 through a conduit 9a formed in the main body, and is designed for connection to a flexible hose, not shown.

The shaft 5 of the electric motor 2 has ends 39 and 40 placed respectively on the rotor winding 6 and commutator 7 sides, which ends are carried rotatively in bearings 41 and 42 formed at the bottom 14 of the shell 12 and at the cap 17, respectively.

The bearing 41 comprises a bushing 43 of an anti-friction material, e.g. sintered iron-copper, which is a press-fit within the sleeve 44 formed from a suitable plastic material being highly resistant to heat, e.g. polyamide. The sleeve 44 is accommodated within a tubular appendage 45, jutting out of the bottom 14.

The bearing 42 is identical to the bearing 41 throughout, and is housed in a tubular appendage 46 jutting out of the cap 17.

The shaft 5 has its end 40 extended through the cap 17 and the disk 18, and drives the rotor 10 rotatively through a coupling 47. The coupling 47 comprises specifically a sleeve, formed from a highly heat resistant plastics such as polyamide, and is fitted over the end 40 of the shaft, within the rotor 10. The sleeve 47 is rotatively rigid both with the shaft and the rotor by the provision of respective dog couplings, known per se.

In operative engagement with the commutator 7 are two brushes 48 and 49, which are mounted on the ends of respective brush-holding arms 50 and 51.

The brush-holding arms 50 and 51 are pivoted rocker-fashion around pins 52 and 53 which comprise posts formed integrally with the cap 17 and extending axially inwardly of the shell 12.

At 54 there is indicated a spring acting between the arms 50 and 51, at the remote ends thereof from the bush carrying ends, to constantly urge the brushes against the commutator.

The brushes 48 and 49 are connected, by respective copper conductor braids 55 and 56 to respective reed contacts 57 and 58, for supplying electric power to the rotor winding 6. The reed contacts extend in the axial direction through passages 59 and 60 extending axially inwards of the posts 28 and 29.

It should be noted that the brush holding arms 50 and 51 are shiftable axially in the axial direction along the pins 52 and 53 between a first pre-assembly position close to the cap, whereat they are held spread apart by stop means 61, and a second operative position away from the cap, whereat said stop means are ineffective and the brushes in pressure contact with the commutator.

The stator 4 of the electric motor 2 comprises a base 62 of sheet metal force fitted into the shell 12, and two oppositely located pole shoes 63 and 64 which are held within the base 62 by a cage, generally indicated at 65 and made of a plastic material such as polycarbonate, in a single piece.

In particular, the cage 65 comprises two small oppositely located frames 66 and 67 matching the curvature of the base and being sized to have said pole shoes 63 and 64 set in, the frames 66 and 67 being interconnected by small fret-like and elastic-deformable crosspieces 68 and 69 which bias the frames away from each other.

The frames 66 and 67 are curved to conform with the circumference of the base 62, whereas the crosspieces 68 and 69 are straight and lie on chords of that same circumference. Indicated at 70 are cleats provided along said crosspieces to hold them along said chords and prevent them from being bent against the base.

At the frame 67, the cage 65 has a lug 71 extending axially toward the bottom 14 and being bent into a hook in an outward direction. Said lug 71 is in hooked engagement with the edge of the base 62, thereby determining the mutual axial positioning of the pole shoes 63 and 64 and the base 62.

Said hook-like lug 71 also engages with an end 72a of a groove 72 formed on the inside of the skirt 13 along a generatrix line thereof and extending substantially as far as the bottom 14. Thus, the lug 71 provides a set axial and angular positioning of the pole shoes and shell relatively to each other. Accordingly, angularly referred to the shell 12 are both the stator 4 of the electric motor 2 and the brushes 48 and 49, by virtue of the dog 21 and notch 22 as mentioned above.

It should be noted that to enable the electric motor 2 to be cooled with the electrical compressor in operation, a circulating air flow is established within the shell 12 as explained herein below. To this aim, two through-going holes indicated at 73 and 74, are formed in the cap 17 which both confront the channel 23. More specifically, the hole 73 opens to the channel 23 at a point of the path s followed by the intake air, and the hole 74 opens to the channel 23 at a point directly past the partition 23a with respect to the passage 38, substantially in the proximity of the slot 30, the latter being located in the remote portion of the channel 23 from the path s.

Thus, the hole 73 will be located in an area where a slight vacuum prevails, whereas the hole 74 will be in an area substantially at atmospheric pressure. A desired air circulation is thus established through the shell 12 interior. In fact, the air within the shell 12 would be sucked out through the hole 73 and ambient air admitted into the shell through the hole 74.

It should be noted that the annular element 31 is advantageously provided, at its skirt 34, with a shield 75 which extends across its interior to guard the intake port 35, and is formed with a window 76 at the reed contacts 57 and 58 and the delivery port 36.

For the installation of this electrical compressor on a motor vehicle, and specifically for securing it to the vehicle body, a box-type projection 77 is provided along a generatrix line of the skirt 13 of the shell 12 externally thereof, said box-type projection defining a groove 78 having a T-shaped cross-section wherein a hammerhead screw 79 is held securely.

The electrical compressor of this invention has shown to be quite free from water seepage, even when tested on vehicle driven under heavy rain, thanks to its overturned bowl-type shell design and to the provision of the intake port at the lower portion thereof.

In addition, the electrical compressor of this invention has also shown to be simple construction-wise, inexpensive to manufacture, and easily assembled.

Also noteworthy is that the inventive electrical compressor has a lighter weight than conventional ones, thanks to the use of low specific gravity materials, such as plastic materials, without its performance being impaired thereby. In this respect, it will be sufficient to recall that the high temperature normally reached by the shaft damages neither the shell nor the cap and rotor, owing to the provision of sleeves formed from a highly heat-resistant material, nor the bearings and coupling.

Of course, in order to meet specific contingent requirements, the skilled one may select to variously modify and alter the electrical compressor according to this invention without, however, departing from the invention true scope, as defined in the appended claims.

I claim:

1. An electric compressor for motor vehicle horns, comprising:

an elecric motor having a stator, a pair of brushes and a shaft provided with a rotor winding and a commutator an air compressor in axial alignment with said electric motor including a casing and a vane rotor rotatably driven by said shaft, wherein said casing comprises a main body having an off-centered chamber for said vane rotor, air intake and delivery ports, a cap forming a stop wall for said chamber and a metal disk positioned in said cap;

a bowl-type shell surrounding said electric motor, said shell having an axis, a bowl bottom and a bowl opening;

bearings positioned in said cap and in said bowl bottom for receiving said motor shaft, each of said bearings comprising a sleeve of highly heat resistant material and a bushing of anti-friction material fitted in said sleeve, said sleeves being housed in tubular appendages extending from said cap and said bowl bottom;

brush holding arms pivotally mounted on pins extending from said cap for mounting said pair of brushes thereon, said axis being axially displaceable along said pins between a pre-assembled position where said brushes are held apart by a stop means, and an operative position where said brushes are in pressure contact with said commutator, wherein said electric motor stator includes a cylindrical base force fitted within said bowl-type shell and a pair of diametrically opposed polar shoes secured in said base by a cage and wherein said electric motor is mounted coaxially adjacent to said bowl bottom and said air compressor is mounted coaxially adjacent to said bowl opening, said air compressor casing forming a closure for said bowl-type shell.

2. An electric compressor according to claim 1, characterized in that said cage comprises two small frames carrying said polar shoes set therein and being interconnected by two elastically deformable crosspieces effective to bias said frames away from each other.

3. An electric compressor according to claim 2, wherein two through-going holes are formed in said cap of said compressor casing at a vacuum region and an atmospheric pressure region, respectively, thereby establishing an air circulation through said bowl-type shell.

4. An electric compressor according to claim 3, wherein a sleeve-type coupling between said shaft and rotor is provided in a highly heat-resistant material.

* * * * *